United States Patent [19]

Vandenberg

[11] 4,135,838

[45] Jan. 23, 1979

[54] VALVE ACTUATOR FASTENER

[75] Inventor: Ervin K. Vandenberg, Muskegon, Mich.

[73] Assignee: Westran Corporation, Muskegon, Mich.

[21] Appl. No.: 815,179

[22] Filed: Jul. 13, 1977

[51] Int. Cl.² .............................................. F16K 31/53
[52] U.S. Cl. .................................. 403/316; 137/315; 251/292
[58] Field of Search ............... 403/315, 316, 335, 336, 403/337, 338; 251/249.5, 250.5, 291, 292; 137/315; 151/41.7, 63

[56] References Cited

U.S. PATENT DOCUMENTS

| | | | |
|---|---|---|---|
| 3,153,548 | 10/1964 | Speakman | 403/316 X |
| 3,418,009 | 12/1968 | Pollia | 403/336 X |
| 3,600,914 | 8/1971 | Johnson et al. | 151/41.7 |
| 3,912,219 | 10/1975 | Weinstein | 251/291 X |
| 4,023,432 | 5/1977 | Killian | 251/274 X |

Primary Examiner—Price C. Faw, Jr.
Assistant Examiner—Conrad L. Berman
Attorney, Agent, or Firm—Gifford, Chandler, VanOphem, Sheridan & Sprinkle

[57] ABSTRACT

A novel fastener is provided for securing a valve actuator housing to a valve mounting flange. The fastener, according to the present invention, comprises an elongated and generally cylindrical pin member which threadably engages the valve mounting flange so that a portion of the pin member extends outwardly from the valve mounting flange. The protruding portion of the pin member is received within an appropriate bore formed in the bottom of the valve actuator housing as the valve actuator housing is positioned on the valve mounting flange. A threaded transverse bore radially intersects the housing bore and threadably receives a locking screw. Upon tightening, the locking screw abuts against a reduced diameter circumferential portion of the pin member and, thus, locks the valve actuator housing to the valve mounting flange.

6 Claims, 2 Drawing Figures

VALVE ACTUATOR FASTENER

BACKGROUND OF THE INVENTION

I. Field of the Invention

The present invention relates to an improved fastener for releasably securing a valve actuator housing to a valve mounting flange.

II. Description of the Prior Art

Many types of valves, for example, pipeline valves, include a valve stem the rotation of which actuates the valve. In most cases, it is impossible to physically rotate the valve stem by hand so that typically a valve actuator is secured on top of the valve. The valve actuator lockingly receives the valve stem and includes gear means for rotatably driving the valve stem.

In order to attach the valve actuator to the valve, it has been the previous practice to provide both an annular mounting flange on top of the valve and a similar mating flange on the bottom of the valve actuator. Thus, when the valve actuator is placed upon the valve, the mounting flanges face and flatly abut against each other. Thereafter, bolts extend through registering apertures in the mounting flanges and threadably engage nuts to thereby secure the mounting flanges together.

One disadvantage of this previously known means for securing the valve actuator to the valve mounting flange is that the mounting flange on the valve actuator is relatively expensive to construct and significantly adds to the overall cost of the valve actuator.

A still further disadvantage of the previously known means for securing the valve actuator to the valve is that significant bolt and nut clearances must be provided both between the flange and the valve actuator and the flange and the valve body. Due to these required bolt and nut clearances, the combined valve and valve actuator are overly and unnecessarily bulky in construction. This increased bulk in construction presents a particularly serious problem where compactness of the valve and valve actuator is either desired or required.

A still further disadvantage of the previously known means for fastening the valve actuator to the valve is that the actual attachment of the valve actuator to the valve is time consuming in practice and, accordingly, involves high labor costs. Furthermore, it is often desirable to use the same valve actuator on a plurality of different valves so that the valve actuator must be repeatedly attached to and detached from the respective valves. Such attachment and detachment of the valve actuators to and from the valves is time consuming in practice.

SUMMARY OF THE PRESENT INVENTION

The present invention overcomes the above-mentioned disadvantages of the previously known means for attaching a valve actuator to a valve by providing a simple, inexpensive, and yet effective fastener for securing the valve actuator to the valve. Moreover, as will hereinafter be described in greater detail, by utilizing the fastener of the present invention, the valve actuator can be easily and rapidly removed from the valve for attachment to another valve.

In brief, each fastener according to the present invention comprises an elongated cylindrical pin member. External threads are provided around a portion of each pin member and at least two members threadably engage threaded bores formed in the valve upper mounting flange. With the pin members thus secured to the mounting flange, a portion of each pin member protrudes outwardly from the flange.

A plurality of axial recesses are formed in the bottom of the valve actuator housing. The recesses are positioned in the housing so that as the valve actuator housing is placed on the valve mounting flange, the protruding portion of each pin member is received within one of the recesses in the valve actuator housing.

A plurality of transverse bores are also formed within the valve actuator housing so that one transverse bore perpendicularly intersects each axial bore. Each transverse bore includes internal threads which threadably receive a locking screw. Upon tightening, the end of the locking screw abuts against a reduced diameter portion of the pin member and effectively secures the valve actuator housing to the valve mounting flange. Conversely, by loosening the locking screw, the valve actuator can be detached from the valve.

The fastener, according to the present invention, thus simply, inexpensively, and yet effectively provides a means for securing a valve actuator to the valve mounting flange which eliminates the previously known valve actuator mounting flange. By the elimination of the mounting flange on the valve actuator, not only the cost but also the bulk of the valve actuator is effectively reduced.

Even more importantly, attachment and detachment of the valve actuator from the valve can be rapidly accomplished, thus, reducing the labor cost for such an operation.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which.

DETAILED DESCRIPTION OF THE PRESENT INVENTION

Figure 1:
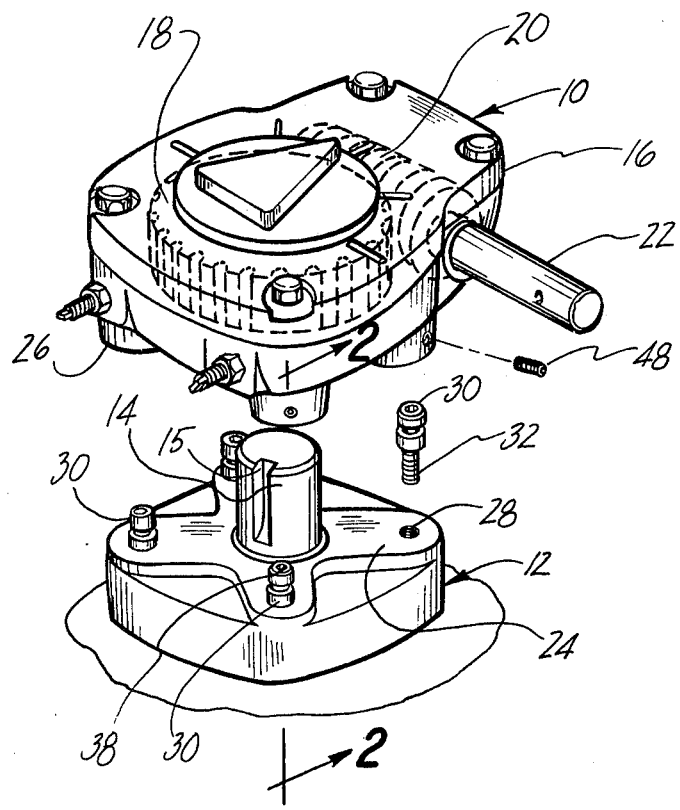
FIG. 1 is an exploded perspective view illustrating the attachment of a valve actuator to a valve utilizing the fastener according to the present invention.

With reference first to FIG. 1, a valve actuator 10 is thereshown adapted for attachment to a valve 12 having a rotatable member 14, the rotation of which actuates the valve 12.

The valve actuator 10 may be of any conventional type and, for example, includes a housing 16 in which a spur gear 18 is rotatably carried. The spur gear 18 is positioned coaxially over the valve rotatable member 14 and is secured thereto by any conventional means, such as a Woodruff key, (not shown) carried in a slot 15 when the valve actuator 10 is positioned over the valve 12 in a manner to be later described. Similarly, a worm gear 20 is rotatably carried within the housing 16 and meshes with the spur gear 18. The worm gear 20 includes an outwardly extending shaft 22. A handle (not shown) is secured to the shaft 22 so that upon rotation of the handle, the valve actuator 10 rotatably drives the valve rotatable member 14.

Figure 2:
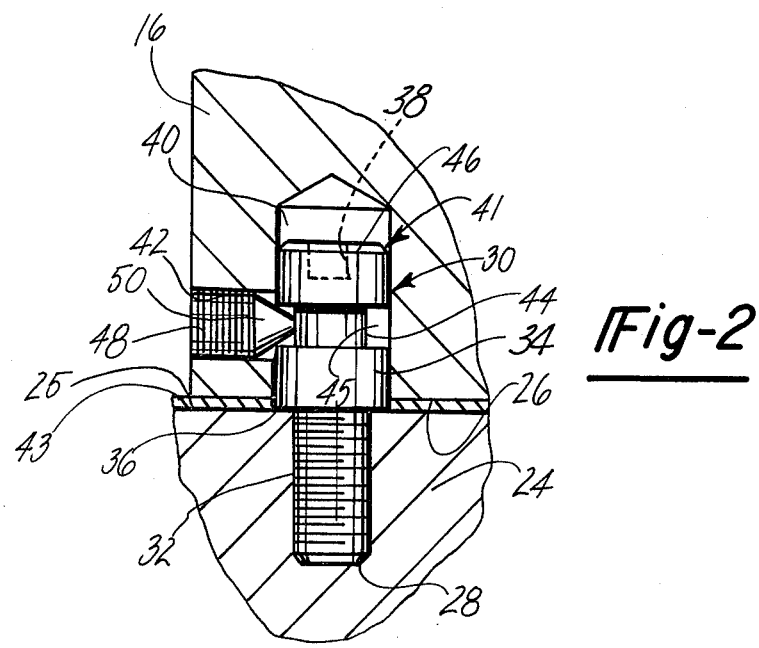
FIG. 2 is a fragmentary cross-sectional view taken substantially along line 2—2 in FIG. 1 and enlarged for clarity.

With reference now to FIGS. 1 and 2, the valve 12 includes an upper mounting flange 24 around the rotatable member 14 which abuts against the bottom 26 of the valve actuator housing 16 upon attachment of the valve actuator 10 to the valve 12. The upper surface 25 of the valve mounting flange 24 is preferably flat and at least one, and preferably four, threaded bores 28 are formed in the flange 24. The axis of each bore 28 is generally perpendicular to the mounting flange surface and, in addition, the bores 28 are preferably both radially and circumferentially equidistantly spaced around the flange 24.

Preferably four fasteners 30 according to the present invention are provided for attaching the valve actuator 10 to the valve mounting flange 24. Each fastener 30 is generally elongated and cylindrical in shape and includes a lower threaded shank 32 and an upper enlarged diameter portion 41. A reduced diameter neck 44 in the fastener upper portion 41 forms an annular channel 45 around and divides the portion 41 into an upper head 46 and a lower enlarged diameter base 34.

As can best be seen in FIG. 2, the threaded shank 32 of each fastener 30 threadably engages one of the threaded bores 28 in the mounting flange 24. The junction of the shank 32 and the base 34 of the fastener 30 forms an annular abutment surface 36 which abuts against the upper surface 25 of the mounting flange 24 to limit the downward travel of the fastener 30 so that the fastener portion 41 protrudes outwardly from the flange 24. In addition, preferably an Allen head recess 38 is formed axially in the fastener head 46 to facilitate the attachment of the fastener 30 to the mounting flange 24.

A plurality of cylindrical recesses 40 (only one of which is shown) are formed in the bottom 26 of the valve actuator housing 16. The recesses 40 are positioned so that each recess 40 receives the protruding portion 41 of one fastener 30 therein as the actuator 10 is positioned on the mounting flange 24 (FIG. 2). The bottom 26 of the housing 16 can flatly abut against the flange 24 or, alternatively, a gasket 43 can be positioned between the housing 16 and the flange 24.

Still referring to FIG. 2, a plurality of transverse bores 42 are formed in the housing 16 so that at least one transverse bore 42 intersects each recess 40, preferably perpendicularly, within the housing 16. In addition, the axis of each transverse bore 42 is spaced a predetermined distance from the bottom 26 of the housing 16 so that the transverse bore 42 intersects the reduced diameter neck 44 of the fastener 30 when the housing 16 is positioned on the flange 24.

A locking screw 48, such as an Allen set screw, and having a tapered nose 50, threadably engages each transverse bore 42 in the valve actuator housing 16. Consequently, as the locking screw 48 is screwed or tightened into the transverse bore 42, the tapered nose 50 of the locking screw 48 enters into the channel 45 and abuts against the lower axial end of the fastener head 46 and/or against the neck 44.

With the locking screw 48 tightened against the fastener 30, movement of the actuator housing 16 away from the flange 24 is prevented by the abutment of the nose 50 with the lower end of the fastener head 46. The locking screw 48 in combination with the fastener 30 thus effectively prevents axial movement of the valve actuator housing 16 relative to the valve mounting flange 24 while, likewise, the provision of at least two fasteners 30 in the mounting flange 24 prevents rotational movement of the valve actuator housing 16 relative to the valve mounting flange 24.

While the operation of the fastener 30 of the present invention should by now be obvious, in summation, the threaded shank 32 of each fastener 30 is first screwed into the valve mounting flange 24 until the base 34 of the fastener 30 abuts against the upper surface of the mounting flange 24. After each fastener 30 has been attached to the valve mounting flange 24 in this fashion and with the locking screws retracted in the bores 42, the valve actuator 10 is positioned upon the valve mounting flange 24 such that the outwardly protruding portion 41 of each fastener 30 is received within the appropriate recess 40 in the valve actuator housing 16.

After the valve actuator 10 is positioned on the valve mounting flange 24, each locking screw 48 is tightened until the nose 50 abuts against either the neck 44 or the lower end of the fastener head 46. With each locking screw 48 tightened against the fastener 30, the valve actuator 10 is securely fastened to the valve mounting flange 24 and ready for valve actuation.

It can, thus, be seen that the fastener 30 of the present invention provides a simple, inexpensive, and yet totally effective means for securing the valve actuator 10 to the valve mounting flange 24. Attachment or detachment of the valve actuator 10 from the valve 12 is easily accomplished by merely loosening the locking screws 48. Moreover, the requirement of the previously known mounting flange for the valve actuator housing 16 is eliminated which likewise eliminates the need to provide bolt clearances for both the valve mounting flange and the previously known valve actuator mounting flange.

Having described my invention, many modifications and alterations thereto will become apparent to those skilled in the art to which it pertains without deviation from the spirit of the invention as defined by the scope of the appended claims.

What is claimed is:

1. In combination with a valve and a valve actuator, said valve actuator having a housing and said valve having a mounting flange, means for securing said valve actuator housing to said mounting flange comprising:
   at least one straight member secured to said mounting flange and having a protruding portion which includes a coaxial reduced diameter portion, adapted to be received in a recess in said valve actuator housing; and
   means for securing said member protruding portion within said recess in said valve actuator housing, said last-mentioned means comprising a portion of said housing including a bore that intersects said recess, and means disposed in said bore for abuttingly engaging said protruding portion.

2. The invention as defined in claim 1 wherein said member is cylindrical in shape and includes a threaded portion for threadably engaging a bore in said mounting flange.

3. The invention as defined in claim 2 wherein the protruding portion of said member includes an enlarged diameter portion which forms an annular abutment surface which abuts against said flange.

4. The invention as defined in claim 2 and including an Allen head recess axially formed in the protruding portion of said member.

5. The invention as defined in claim 1 in which said last mentioned means comprises a screw which threadably engages said bore.

6. The invention as defined in claim 5 in which said screw includes a tapered nose portion.

* * * * *